US007206315B2

(12) United States Patent
Matsuzawa et al.

(10) Patent No.: US 7,206,315 B2
(45) Date of Patent: *Apr. 17, 2007

(54) ROUTER DEVICE AND CUT-THROUGH PATH CONTROL METHOD FOR REALIZING LOAD BALANCING AT INTERMEDIATE ROUTERS

(75) Inventors: Shigeo Matsuzawa, Tokyo (JP); Toru Konno, Tokyo (JP); Akiyoshi Mogi, Tokyo (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/313,643

(22) Filed: Dec. 22, 2005

(65) Prior Publication Data
US 2006/0109853 A1    May 25, 2006

Related U.S. Application Data

(63) Continuation of application No. 09/429,632, filed on Oct. 29, 1999, now Pat. No. 7,009,987.

(30) Foreign Application Priority Data
Oct. 30, 1998    (JP)    ............................. 10-311315

(51) Int. Cl.
H04L 12/28    (2006.01)
H04L 12/56    (2006.01)

(52) U.S. Cl. .................. 370/409; 370/392; 370/396; 370/397; 709/238

(58) Field of Classification Search ........... 370/395.43, 370/352, 401, 389, 392, 393, 396, 397, 390, 370/398, 409; 709/238, 242; 718/105
See application file for complete search history.

(56) References Cited

U.S. PATENT DOCUMENTS 5,996,021 A * 11/1999 Civanlar et al. ............ 709/238

(Continued)

FOREIGN PATENT DOCUMENTS

JP    07-235939 A    9/1995
JP    10-262046 A    9/1998

OTHER PUBLICATIONS

D. Awduche et al., "Extensions to RSVP for Traffic Engineering", Aug. 1998, pp. 1-40.

(Continued)

*Primary Examiner*—Huy D. Vu
*Assistant Examiner*—Chuong T. Ho
(74) *Attorney, Agent, or Firm*—Foley & Lardner LLP

(57) ABSTRACT

A router device and a cut-through path control method capable of carrying out the load balancing at an intermediate router device which actually has a multi-path information, without requiring a special processing at the edge router are disclosed. At a router device at which multi-path exists, one router among a plurality of routers that can possibly be a next hop router is selected so as to contribute to a load balancing, according to a whole or a prescribed part of information regarding a state of cut-through path set up in which the router device is involved, at a time of setting up a cut-through path in the multi-path, and a prescribed control for setting up the cut-through path with that one router as the next hop router is carried out. Also, one cut-through path that contributes to the load balancing when a route change is made is selected among cut-through paths for which the route change at the router device is possible, and a route of that one cut-through path is changed so as to contribute to the load balancing.

6 Claims, 9 Drawing Sheets

U.S. PATENT DOCUMENTS

| | | | |
|---|---|---|---|
| 6,009,097 A | 12/1999 | Han | |
| 6,016,319 A | 1/2000 | Kshirsagar et al. | |
| 6,185,213 B1 * | 2/2001 | Katsube et al. | 370/397 |
| 6,253,230 B1 | 6/2001 | Couland et al. | |
| 6,336,129 B1 | 1/2002 | Ise et al. | |
| 6,339,586 B1 * | 1/2002 | Motobayashi | 370/238 |
| 6,343,322 B2 | 1/2002 | Nagami et al. | |
| 6,351,465 B1 * | 2/2002 | Han | 370/395.43 |
| 6,374,303 B1 * | 4/2002 | Armitage et al. | 709/242 |
| 6,480,468 B1 * | 11/2002 | Kishigami et al. | 370/230.1 |
| 6,530,032 B1 | 3/2003 | Shew et al. | |
| 7,009,987 B1 * | 3/2006 | Matsuzawa et al. | 370/409 |

OTHER PUBLICATIONS

J. Moy, "OSPF Version 2", Internet RFC2328, Apr. 1998, pp. 1-244.

* cited by examiner

FIG.6

| 601 | 602 | 611 NEXT HOP INFORMATION | 61N NEXT HOP INFORMATION | 603 |
|---|---|---|---|---|
| DESTINATION ADDRESS | NUMBER NEXT HOP INFORMATION | | | NUMBER OF CUT-THROUGH PATHS |
| ......... | ......... | ......... | ......... | |

FIG.7

| 701 RECEIVED LABEL | 702 OUTPUT INTERFACE | 703 OUTPUT LABEL VALUE |
|---|---|---|
| ......... | ......... | ......... |

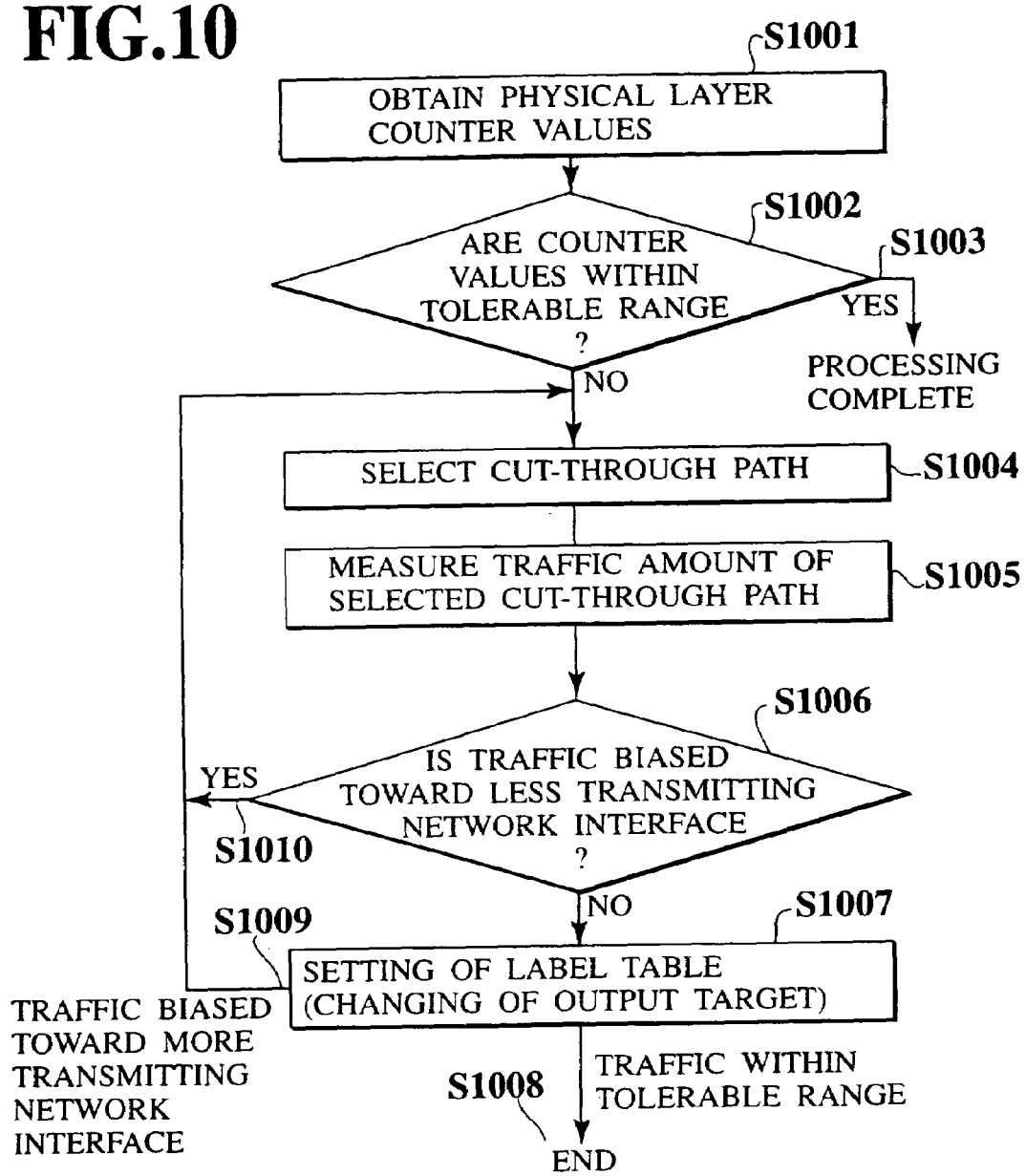

ROUTER DEVICE AND CUT-THROUGH PATH CONTROL METHOD FOR REALIZING LOAD BALANCING AT INTERMEDIATE ROUTERS

The present application is a continuation of U.S. application Ser. No. 09/429,632, filed Oct. 29, 1999, now U.S. Pat. No. 7,009,987, the entire contents of which is incorporated herein by reference.

BACKGROUND OF THE INVENTION

1. Field of the Invention

The present invention relates to a router device for setting up a cut-through path and a method for controlling a cut-through path.

2. Description of the Background Art

A router device for transferring data gram by analyzing an IP (Internet Protocol) header uses a routing protocol for the purpose of determining a next hop transfer target. In one such routing protocol called OSPF (Open Shortest Path Fast) (see J. Moy, "OSPF Version 2", Internet RFC2328, April 1998, for example), when a plurality of next hop transfer targets exist corresponding to a plurality of routes of the same cost up to a final destination network or host, it is possible to maintain a plurality of next hop transfer target information. Here, the cost refers to an information such as the number of intermediate routers to be passed, for example, where the lowest cost implies the shortest route.

This function is utilized for the load balancing in such a way that, when a router device for transferring datagrams has a plurality of next hop transfer target router information, datagrams are outputted uniformly over these next hop transfer target routers so as to avoid loading only a particular router device heavily. Here, the important point is that, at a time of the load balancing, there is a need to make sure that the orders among datagrams are not reversed in the data transfer between two hosts.

On the other hand, in the label switching technique that has been proposed as a scheme for realizing a fast transfer of datagrams such as those of IP, the IP header information is not looked during the datagram transfer so that it is difficult to guarantee the orders among datagrams in the data transfer between two hosts.

For this reason, the label switching technique adopts a scheme for setting up a plurality of paths (called label switched paths) for carrying out a cut-through transfer from a device (called edge router) that currently carries out a transfer based on the IP header, and transferring datagram to one of the plurality of cut-through paths that are set up at the edge router.

For the label switched path set up in this scheme, there exists a set up called Explicit Route which enforces passing of each path at a time of starting the set up from the edge router.

In the case of the set up according to Explicit Route, it is necessary for the edge router to recognize a deletion of a specified route (router device) due to the change of a route at an intermediate router device or the like, and at a time of notifying the deletion of the specified route from a router that detected it to the edge router, there are cases which require special means such as the use of information on the routing protocol or a protocol for generating the cut-through.

Also, in the conventional method, even when a given router itself does not have a plurality of routes, there is a need to recognize a plurality of routes, which is difficult depending on the routing protocol, so that there is a possibility for a network manager to be required to make a registration at a time of network designing.

As described, conventionally, there has been a problem that, in the case of carrying out the load balancing regarding the cut-through path, the edge router of that cut-through path that is to be route changed for the purpose of load balancing must be involved in this process. Also, for this reason, there has been a problem that the control and implementation become complicated and it is difficult to realize the effective load balancing.

SUMMARY OF THE INVENTION

It is therefore an object of the present invention to provide a router device and a cut-through path control method capable of carrying out the load balancing at an intermediate router device which actually has a multi-path information, without requiring a special processing at the edge router.

According to one aspect of the present invention there is provided a cut-through path control method at a router device at which multi-path exists, comprising the steps of: selecting one router among a plurality of routers that can possibly be a next hop router so as to contribute to a load balancing, according to a whole or a prescribed part of information regarding a state of cut-through path set up in which the router device is involved, at a time of setting up a cut-through path in the multi-path; and carries out a prescribed control for setting up the cut-through path with said one router as the next hop router.

According to another aspect of the present invention there is provided a cut-through path control method at a router device at which multi-path exists, comprising the steps of: selecting one cut-through path that contributes to a load balancing when a route change is made, among cut-through paths for which the route change at the router device is possible; and changing a route of said one cut-through path so as to contribute to the load balancing.

According to another aspect of the present invention there is provided a router device at which multi-path exists, comprising: a processing unit configured to select one router among a plurality of routers that can possibly be a next hop router so as to contribute to a load balancing, according to a whole or a prescribed part of information regarding a state of cut-through path set up in which the router device is involved, at a time of setting up a cut-through path in the multi-path; a control unit configured to carry out a prescribed control for setting up the cut-through path with said one router as the next hop router; and a transfer unit configured to transfer datagrams using the cut-through path.

According to another aspect of the present invention there is provided a router device at which multi-path, exists, comprising: a processing unit configured to select one cut-through path that contributes to a load balancing when a route change is made, among cut-through paths for which the route change at the router device is possible; a control unit configured to change a route of said one cut-through path so as to contribute to the load balancing; and a transfer unit configured to transfer datagrams using the cut-through path.

According to another aspect of the present invention there is provided a computer usable medium having computer readable program code means embodied therein for causing a computer to function as a router device at which multi-path exists, the computer readable program code means includes: first computer readable program code means for causing said computer to select one router among a plurality of routers that can possibly be a next hop router so as to contribute to a load balancing, according to a whole or a prescribed part of information regarding a state of cut-through path set up in which the router device is involved, at a time of setting up a cut-through path in the multi-path; second computer readable program code means for causing said computer to carry out a prescribed control for setting up the cut-through path with said one router as the next hop router; and third computer readable program code means for causing said computer to transfer datagrams using the cut-through path.

According to another aspect of the present invention there is provided a computer usable medium having computer readable program code means embodied therein for causing a computer to function as a router device at which multi-path exists, the computer readable program code means includes: first computer readable program code means for causing said computer to select one cut-through path that contributes to a load balancing when a route change is made, among cut-through paths for which the route change at the router device is possible; second computer readable program code means for causing said computer to change a route of said one cut-through path so as to contribute to the load balancing; and third computer readable program code means for causing said computer to transfer datagrams using the cut-through path.

Other features and advantages of the present invention will become apparent from the following description taken in conjunction with the accompanying drawings.

BRIEF DESCRIPTION OF THE DRAWINGS

FIG. 6 is a diagram showing an exemplary configuration of a routing table used in the router device of FIG. 2.

FIG. 7 is a diagram showing an exemplary configuration of a label table used in the router device of FIG. 2.

FIG. 10 is a flow chart showing another exemplary cut-through path re-setting procedure that can be carried out by the router device of FIG. 8.

FIG. 11 is a diagram showing an exemplary configuration of a label table used in the router device of FIG. 8.

DETAILED DESCRIPTION OF THE PREFERRED EMBODIMENTS

Referring now to FIG. 1 to FIG. 11, one embodiment of a router device and a cut-through path control method according to the present invention will be described in detail.

Figure 1:
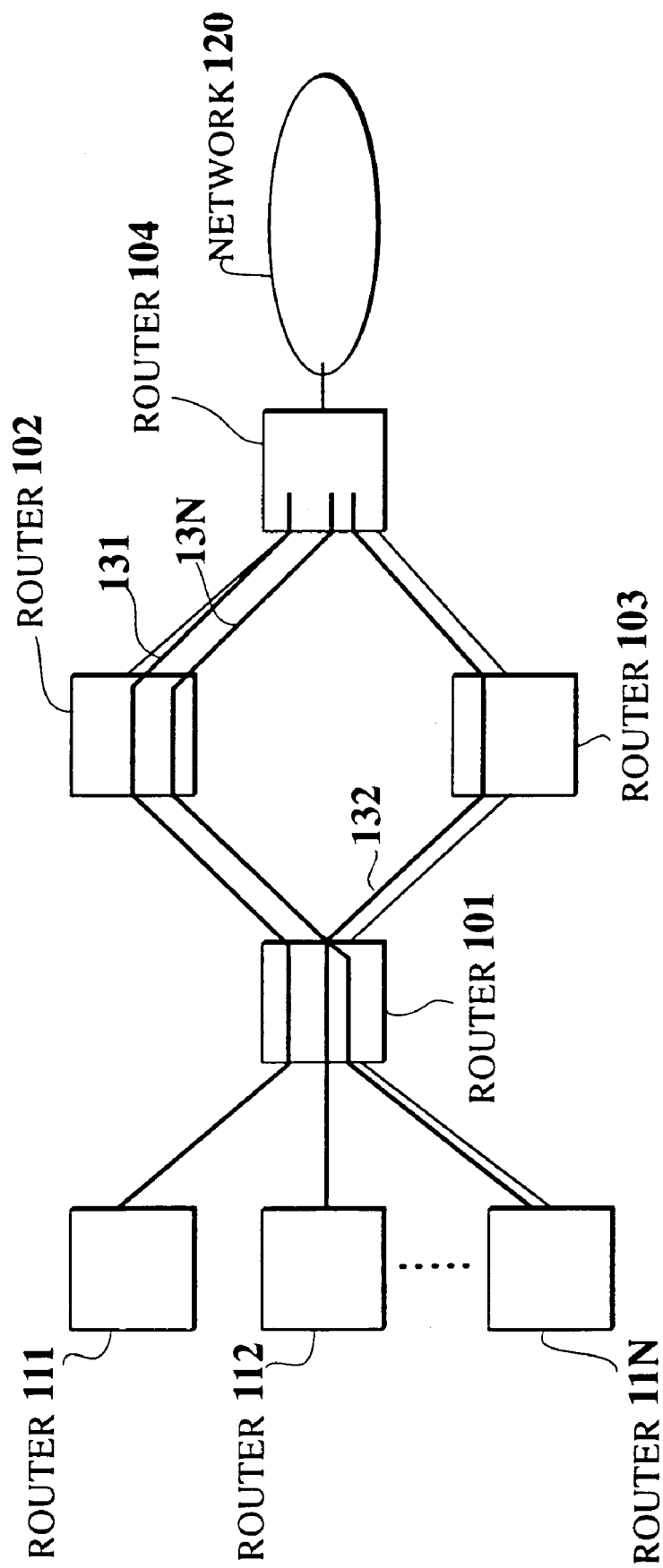
FIG. 1 is a diagram showing an exemplary configuration of a network containing a router device according to the preferred embodiment of the present invention.

FIG. 1 shows an exemplary network into which the label switching is introduced, in which a router device can have a plurality of next hop information.

Each one of router devices 101 to 103 is a device having a function for generating a path (which will be referred to as a cut-through path hereafter) that enables a fast datagram transfer based only on a lower layer information without looking at the IP header information, by sharing a common recognition regarding information on a datagram flow to be transferred and a lower layer information among the routers.

As a way of obtaining a common recognition regarding a specific datagram information and a lower layer information (which will be referred to as a label hereafter), a protocol such as FANP (Flow Attribute Notification Protocol), TDP (Tag Distribution Protocol), or LDP (Label Distribution protocol) can be used.

A router device 104 is a device that is connected with the router devices 102 and 103 and a network 120 located beyond these router devices, where a protocol such as FANP, TDP or LDP is operating between this router device 104 and the router device 102 and the router device 103, which has a function for setting up a cut-through path and a function as a final hop of the cut-through path.

Each one of router devices 111 to 11N is a device that is connected with the router device 101, where a protocol such as FANP, TDP, or LDP is operated similarly as in the router device 104, which also has a function for setting up a cut-through path and a function as a final hop of the cut-through path.

Note that the router devices 101 to 103, 104, and 111 to 11N are distinguished above for the convenience of the following description, but all the router devices can be devices having a cut-through transfer function.

In the network of FIG. 1, a routing protocol for determining a transfer target of an IP datagram is operating between the routers, and the routing protocol that is operating here can be OSPF (Open Shortest Path Fast), for example.

By operating the routing protocol on the network, in the case of transferring the datagram from the router device 101 to the network 120 or the router device 104, the router device 101 can recognize that the network 120 or the router device 104 is reachable at the same cost by adopting either one of a route via the router device 102 and a route via the router device 103. As a result, the router device 101 may transfer datagram to either the router 102 or the router 103 at a time of the datagram transfer.

In such a configuration, the case of generating cut-through paths 131 to 13N using a protocol such as FANP. TDP or LDP, with respect to the network 120 or the router device 104 from the router devices 111 to 11N will be described.

In this case, the router device 101 transfers set up messages respectively arrived from the router devices 111 to 11N towards a direction of the router device 104 or the network 120, and similarly as in the case of datagram transfer, the router device 101 may transfer them to either the router device 102 or the router device 103 as a next router device for transferring messages for the purpose of extending the cut-through paths.

Figure 2:
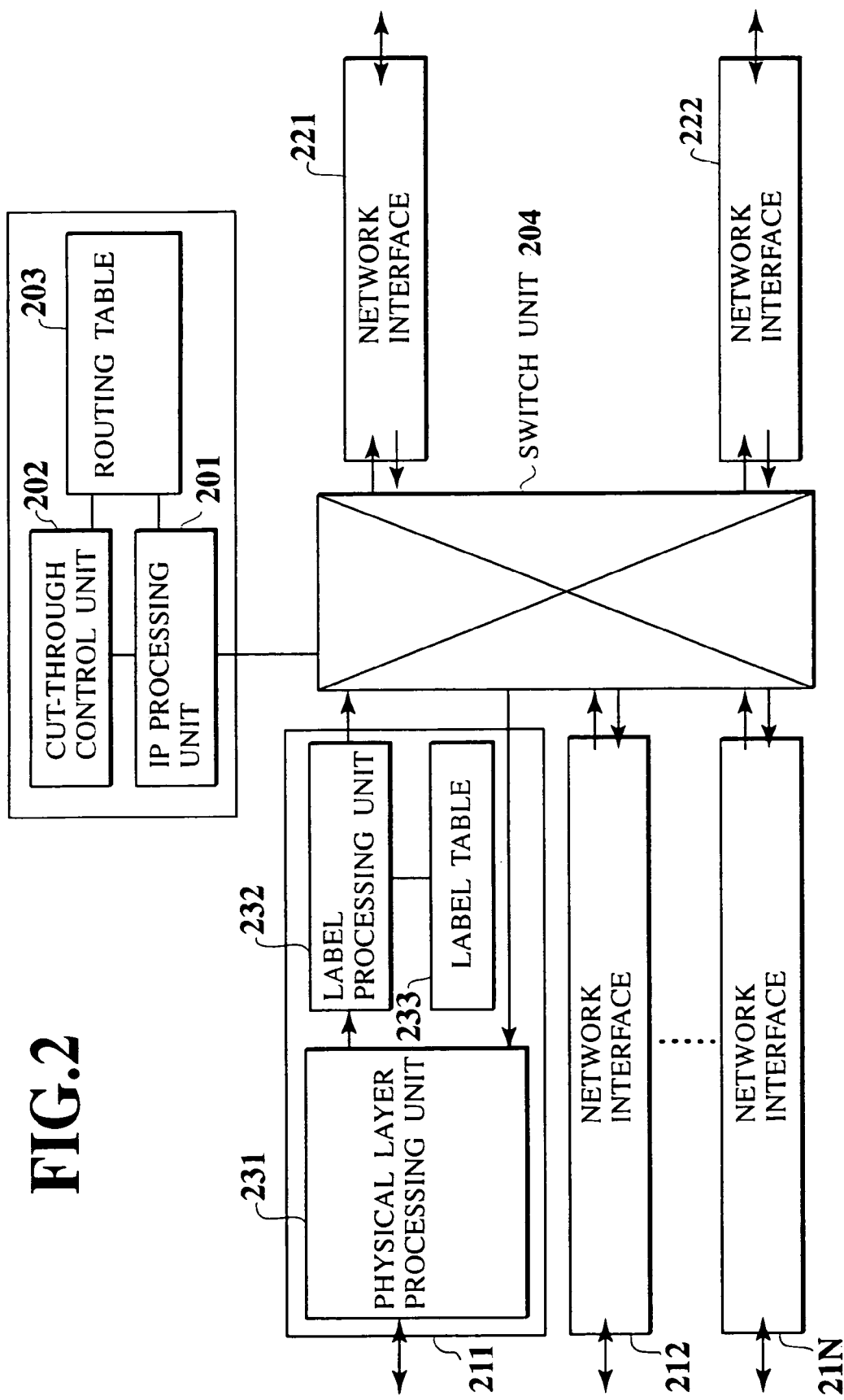
FIG. 2 is a block diagram showing one exemplary configuration of a router device according to the preferred embodiment of the present invention.

Now, FIG. 2 shows an exemplary configuration of the router device 101 provided within the exemplary network configuration of FIG. 1. Note that the router device 102 or the router device 103 may have the same configuration, but only the router device 101 has multi-path in the exemplary network configuration of FIG. 1 so that the router device 101 will be described here as an example.

An IP processing unit 201 checks whether an IP datagram is destined to the own device or not according to a destination information of the datagram, and for the datagram destined to the own device, the reception processing is carried out and the datagram is transferred to an upper layer protocol (TCP, for example), whereas for the datagram not destined to the own device, a next hop transfer target is determined and a processing for transferring the datagram to a next hop router device is carried out.

Note that the router device 101 has a label switching function using labels so that it is not absolutely necessary for the router device 101 to have a transfer function with respect to the datagram not destined to the own device. However, in the case where the router devices 104 and 111 to 11N are provided in the configuration of FIG. 1, it is necessary for these router devices to have a transfer function with respect to the datagram not destined to the own device because any of these router devices can be a start point or an end point of a cut-through path.

A cut-through control unit 202 carries out a protocol to be used in obtaining a common recognition regarding the datagram flow and the label information with the neighboring router devices (by exchanging information on the datagram flow and the labels).

A routing table 203 is a table used in obtaining a next hop router device from the destination address, where it is possible to have a plurality of next hop information but the next hop information is not necessarily always plural because there can be cases where no multi-path exists depending on the route.

Network interfaces 211 to 21N are respectively connected to the routers 111 to 11N, and can be provided in any form as long as FANP, TDP or LDP is usable on a physical layer. For example, they can be provided in forms of ATM, frame relay, Ethernet, etc.

A network interface 221 is connected to the router device 102 and operates similarly as the network interfaces 211 to 21N (here it is assumed to have the same configuration as the network interfaces 211 to 21N).

A network interface 222 is connected to the router device 103 and operates similarly as the network interfaces 211 to 21N (here it is assumed to have the same configuration as the network interfaces 211 to 21N).

A switch unit 204 is a switch device capable of directly switching datagram from one network interface to another network interface when the cut-through transfer is possible.

Now, a configuration of each network interface will be described using the network interface 211 as an example.

A physical layer processing unit 231 carries out different types of processing according to the physical layer accommodated by the network interface, such as the cell synchronization processing, etc., in the case of ATM and the MAC processing, etc., in the case of Ethernet.

A label processing unit 232 determines a label for a next hop router device by referring to the label table 233 after extracting a label from the header information of the received datagram (frame), and carries out a processing for transferring the datagram to the next hop router directly through the switch unit 204 without carrying out the datagram transfer processing using IP header, etc.

Note that, in the case of ATM, a switch table in terms of VPI/VCI used by the ATM switch or the like can be used directly as the label processing unit 232 and the label table 233, and in the case where the network interfaces possessed by the router device 101 are all given in forms of ATM, all the functions of the network interfaces 211 to 21N, 221 and 222, the label processing unit 232, the label table 233 and the switch unit 204 can be realized by an ATM switch.

In the following, the cut-through path set up procedure at the router device 101 will be described.

Figure 3:
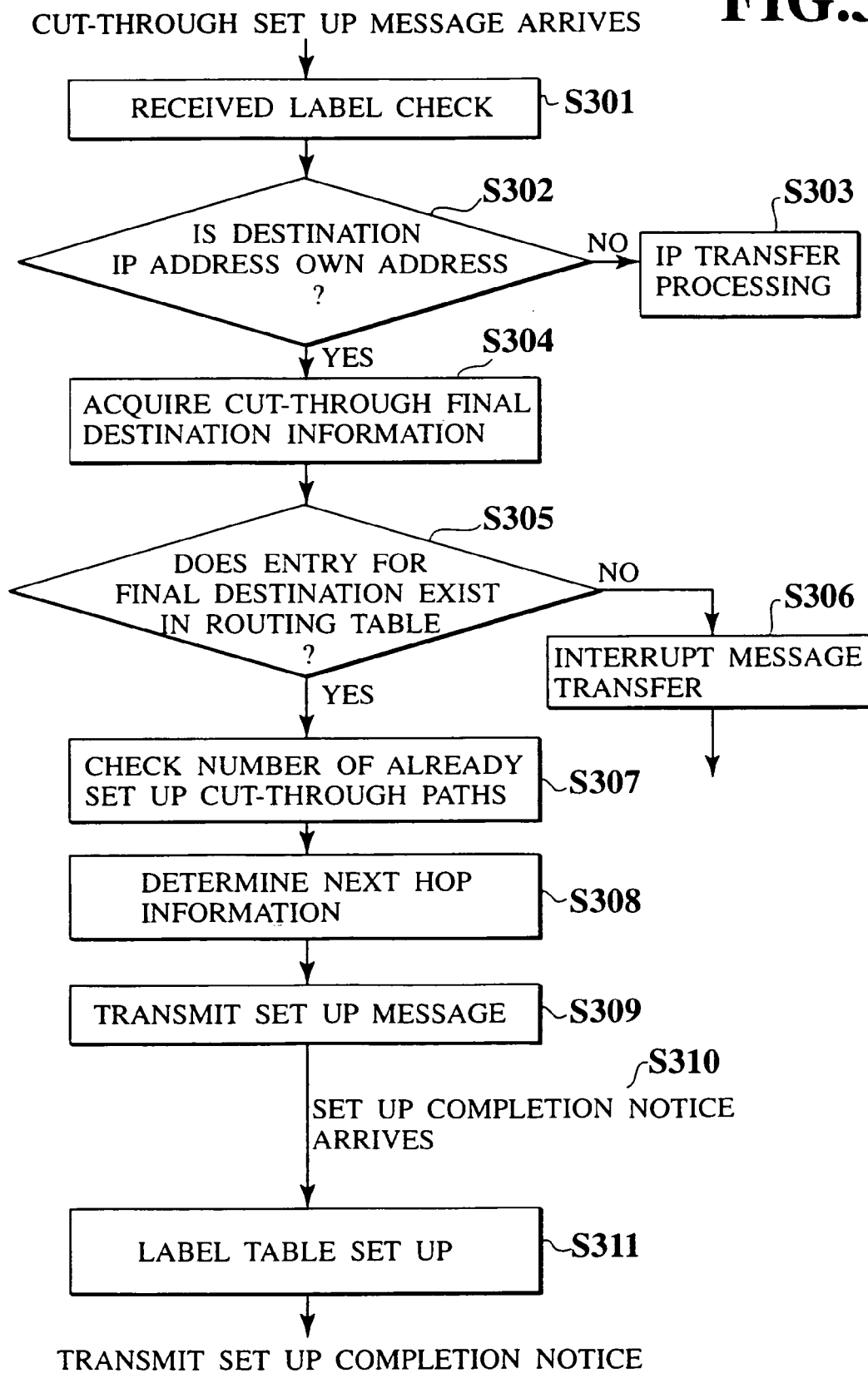
FIG. 3 is a flow chart showing one exemplary cut-through path set up procedure that can be carried out by the router device of FIG. 2.

FIG. 3 shows an exemplary processing procedure of the router device 101 in the case of generating a cut-through path from the router device 111 to 11N with respect to the network 120 or the router device 104 as the final destination in the network shown in FIG. 1. Here, the exemplary case of not carrying out the merging will be described.

Note that the operation is different depending on a protocol for generating the cut-through path, and an exemplary case of transferring message to a next hop router at a timing of a cut-through path generation message (which will be referred to as a set up message hereafter) will be described here.

The cut-through path generation message received from the network interface 211 to 21N of the router device 101 is transferred to the IP processing unit 201 after referring to the label table 233 at the label processing unit 232 and determining that the datagram processing such as that of IP is to be carried out without transferring it directly to another network interface (step S301).

Note that a condition for carrying out the datagram processing is different depending on a protocol, but the transfer processing with respect to the IP processing unit 201 that is carried out at the switch unit 204 is basically the same.

The IP processing unit 201 to which the set up message is transferred then makes a judgement as to whether it is a message to be received by the own device or not, and sends data to the cut-through control unit 202 when it is a cut-through protocol message (step S302).

On the other hand, when the IP processing unit 201 judges that it is not a message to be received by the own device, the IP transfer processing is to be carried out so that the IP processing unit 201 determines a next hop router device by referring to the routing table 203, and transfers data to the next hop router device (step S303). At this point, if the router device 101 has a device configuration without the IP transfer function, the datagram will be discarded.

Next, at the cut-through control unit 202 that received the set up message from the IP processing unit 201, the final destination for the purpose of generating the cut-through path that is contained in the received message is acquired (step S304).

At the cut-through control unit 202, the next hop router device is obtained by referring to the routing table 203 using the acquired final destination (step S305), and if the final destination is not reachable, the transfer of this message is interrupted (step S306).

Note that the operation after the message transfer interruption is different depending on the cut-through path generation protocol, and can be returning of a response (a response message will be referred to as a set up completion message hereafter) to the previous hop router device 111 to 11N from the router device 101 or stopping of the protocol operation.

On the other hand, when the final destination exists at the step S305, the next hop router device information is obtained from an entry of the routing table 203 for the final destination.

In the network of FIG. 1, the router device 101 maintains the router device 102 and the router device 103 as the next hop information with respect to the router device 104 and the network 120 as already mentioned above.

At this point, the cut-through control unit 202 checks the number of already set up cut-through paths (a cut-through number) with respect to the same final destination (step S307).

The number of already set up cut-through paths is used in the judgement to obtain the next hop information. In the case where there are two next hop information as in the network configuration of FIG. 1, the next hop information is determined by an algorithm which selects the router device 102 when the number of already set up cut-through paths is 0 or even, or the router device 103 when the number of already set up cut-through paths is odd (step S308), for example.

Note that when there are n pieces of the next hop information, the next hop router devices can be selected sequentially according to a value of "c mod n", for example, where c is the number of already set up cut-through paths.

Also, the next hop router device selection algorithm is not limited to this, and any algorithm can be used as long as it sets an identical (or nearly identical) number of paths to each next hop router device or it distributes paths uniformly among the next hop router devices.

At the cut-through control unit 202 which determined the next hop router device in this way, the set up message is transmitted to the router device 102 through the network interface 221 if the router device 102 is determined as the next hop router device or to the router device 103 through the network interface 222 if the router device 103 is determined as the next hop router device (step S309).

After that, at a timing where the set up completion message arrives from the router device 104 that is an end point of the cut-through path or an intermediate router device (step S310), a correspondence between the flow information and label information contained in the received message and the corresponding transmission flow information and label information is established, so that the cut-through path set up to an output network interface 221 or 222 from the input network interface 211 to 21N becomes possible, and therefore a transition to the cut-through transfer becomes possible (step S311).

The transition to the cut-through transfer is completed by setting the output label information in the label table 233 existing on the receiving network interface 211 to 21N, in the case of the router device in the configuration shown in FIG. 2.

When the transition to the cut-through transfer is completed, the cut-through control unit 202 transfers the set up completion message to the previous hop router device.

In this way, by making the number of paths for each next hop router device identical (or nearly identical) in view of the number of already set up cut-through paths in the procedure for determining the next hop router, it becomes possible to realize the load balancing at the path level.

Next, the case of supporting a merging function capable of transmitting a plurality of input labels to a single output label at the switch unit 204 in the router device 101 shown in FIG. 2 will be described.

Figure 4:
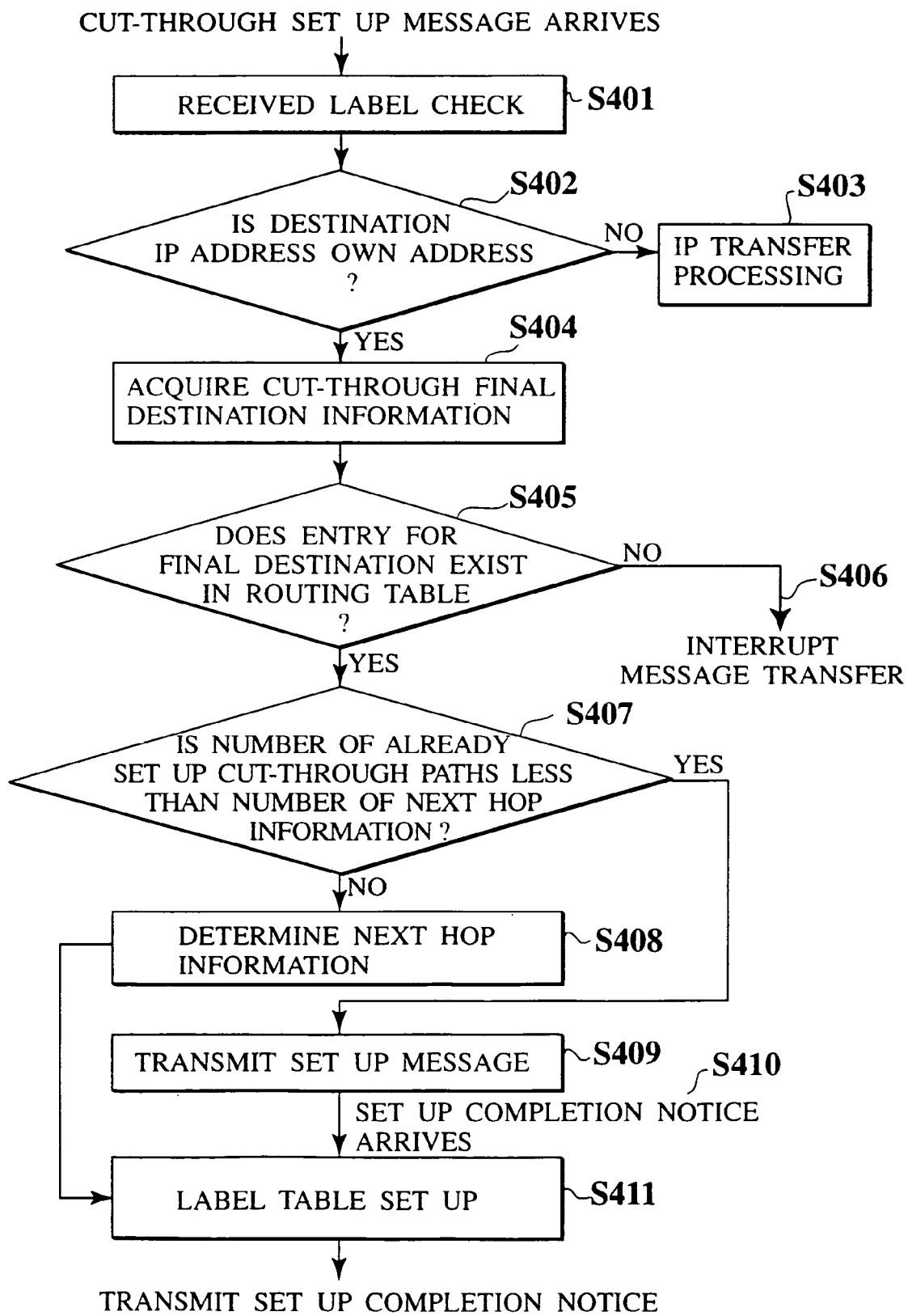
FIG. 4 is a flow chart showing another exemplary cut-through path set up procedure that can be carried out by the router device of FIG. 2.

FIG. 4 shows an exemplary processing procedure of the router device 101 in the case where the router device 101 has the merging function (carries out the merging), when the router device 111 to 11N generates the cut-through path with the network 120 or the router device 104 as the final destination, for example.

The cut-through path generation message received from the network interface 211 to 21N of the router device 101 is transferred to the IP processing unit 201 after referring to the label table 233 at the label processing unit 232 and determining that the datagram processing such as that of IP is to be carried out without transferring it directly to another network interface (step S401).

Note that a condition for carrying out the datagram processing is different depending on a protocol, but the transfer processing with respect to the IP processing unit 201 that is carried out at the switch unit 204 is basically the same.

The IP processing unit 201 to which the set up message is transferred then makes a judgement as to whether it is a message to be received by the own device or not, and sends data to the cut-through control unit 202 when it is a cut-through protocol message (step S402).

On the other hand, when the IP processing unit 201 judges that it is not a message to be received by the own device, the IP transfer processing is to be carried out so that the IP processing unit 201 determines a next hop router device by referring to the routing table 203, and transfers data to the next hop router device (step S403). At this point, if the router device 101 has a device configuration without the IP transfer function, the datagram may be discarded.

Next, at the cut-through control unit 202 that received the set up message from the IP processing unit 201, the final destination for the purpose of generating the cut-through path that is contained in the message is acquired (step S404).

Also, the next hop router device is obtained by referring to the routing table 203 using the acquired final destination (step S405), and if the final destination is not reachable, the transfer of this message is interrupted (step S406).

Note that the operation after the message transfer interruption is different depending on the cut-through path generation protocol, and can be returning of a response to the previous hop router device 111 to 11N from the router device 101 or stopping of the protocol operation.

On the other hand, when the final destination exists at the step S405, the next hop router device information is obtained from an entry of the routing table 203 for the final destination.

In the network of FIG. 1, the router device 101 maintains the router device 102 and the router device 103 as the next hop information with respect to the router device 104 and the network 120 as already mentioned above.

Next, the next hop router device is to be selected at the cut-through control unit 202, and at this point, the cut-through control unit 202 checks the number of already set up cut-through paths with respect to the same final destination (step S407).

The number of already set up cut-through paths is used in the judgement to obtain the next hop information. Similarly as in the case of FIG. 3, the next hop information is determined by an algorithm which selects the router device 102 when the number of already set up cut-through paths is 0 or even, or the router device 103 when the number of already set up cut-through paths is odd (step S408), for example.

As mentioned above, the next hop router device selection algorithm is not limited to this, and any algorithm can be used as long as it sets an identical (or nearly identical) number of paths to each next hop router device or it distributes paths uniformly among the next hop router devices.

Next, in the case where the number of already set up cut-through paths is less than the number of next hop information maintained, that is, in the case where the number of already set up cut-through paths is 0 or 1 in this example, the maximum number (two in this example) of the cut-through paths are not yet generated, so that the set up message is transmitted to the determined next hop router device (step S409).

After that, at a timing where the set up completion message arrives from the router device 104 that is an end point of the cut-through path or an intermediate router device (step S410), a correspondence between the flow information and label information contained in the received message and the corresponding transmission flow information and label information is established, so that the cut-through path set up to an output network interface 221 or 222 from the input network interface 211 to 21N becomes possible, and therefore a transition to the cut-through transfer becomes possible (step S411).

The transition to the cut-through transfer is completed by setting the output label information in the label table 233 existing on the receiving network interface 211 to 21N, in the case of the router device in the configuration shown in FIG. 2.

Also, in the case where the number of already set up cut-through paths is greater than or equal to the number of next hop information maintained, that is, in the case where the number of already set up cut-through paths is 2 or more in this example, the cut-through paths for transmission are already set up with respect to respective next hop routers, so that the transition to the cut-through transfer is completed when the cut-through control unit 202 sets the label table on the input network interface 211 to 21N of the received set up message so as to transmit by merging to the already set up cut-through paths, with respect to the determined next hop router information (step S411).

After that, the set up completion message is returned to the router device from which the set up message was sent.

Note that, in the case of carrying out the merging as described above, in determining the next hop information at the step S408, it is preferable not to select one next hop information more than once until every next hop information is selected once (this is the case in the above example). However, by relaxing the selection criterion, it is also possible to select one next hop information more than once before every next hop information is selected once. In such a case, in the above procedure, the condition that the number of already set up cut-through paths is greater than or equal to the number of next hop information maintained will be replaced by a condition that the cut-through path to be a target of merging is already set up, and the condition that the number of already set up cut-through paths is less than the number of next hop information maintained will be replaced by a condition that the cut-through path to be a target of merging is not yet set up (note that this condition can also be used in the procedure of FIG. 4).

Next, the case accounting for different link rates (network bandwidths) of the network interfaces with respect to a plurality of next hop information that can be selected will be described.

For example, it is possible to consider the case where the link rates of the network interface 221 and the network interface 222 of the router device 101 are different. Consequently, it is preferable to carry out the load balancing by accounting for the link rates.

Figure 5:
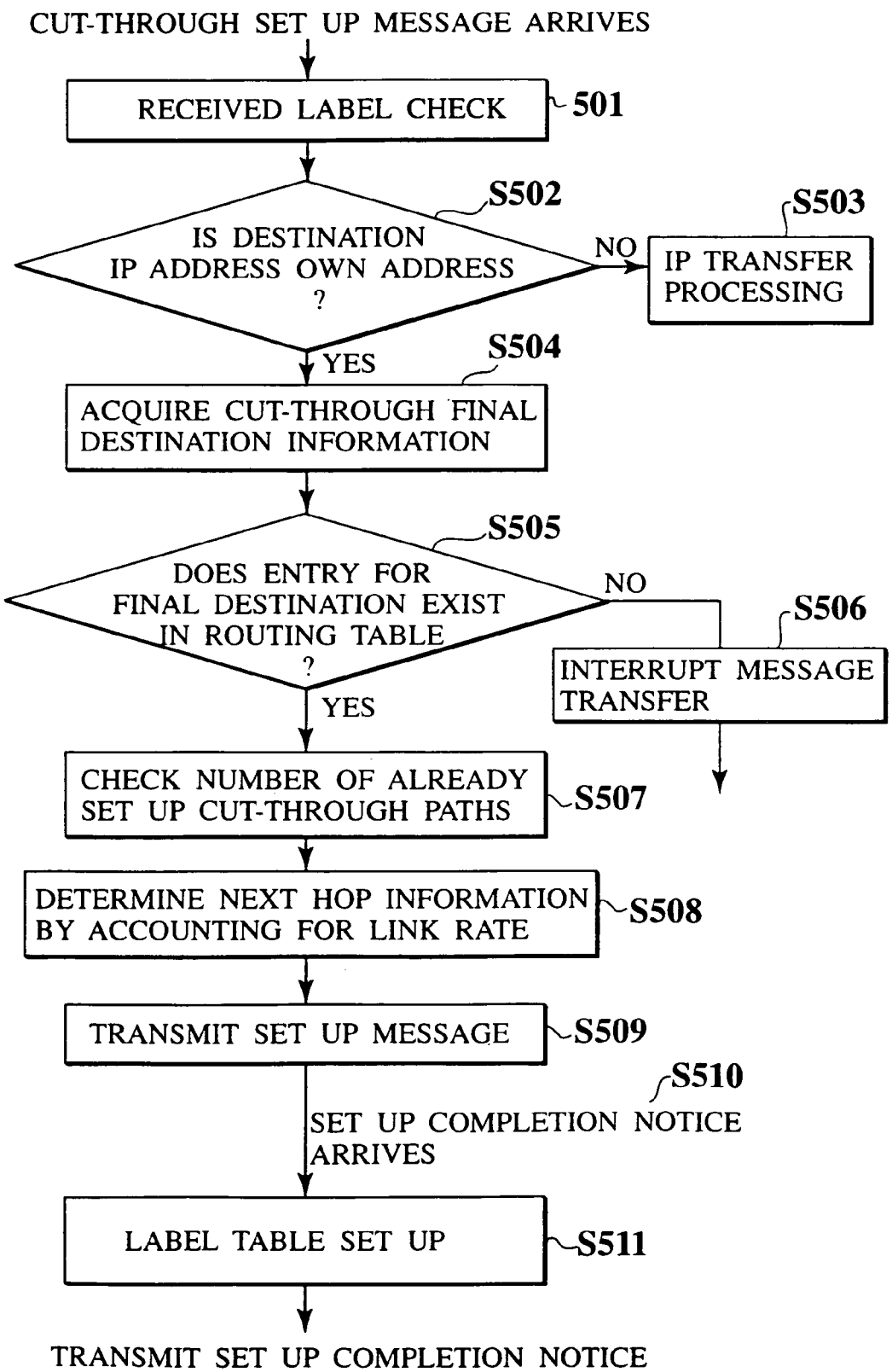
FIG. 5 is a flow chart showing still another exemplary cut-through path set up procedure that can be carried out by the router device of FIG. 2.

FIG. 5 shows an exemplary processing procedure of the router device 101 at a time of cut-through path generation in such a case. Here, the case of not carrying out the merging will be described.

Also, the exemplary case described here is directed to the case of generating the cut-through path from the router device 111 to 11N to the network 120 or the router device 104 as the final destination and a ratio of the link rates of the network interface 221 and the network interface 222 is 1:2 (the network interface 222 is faster than the network interface 221).

The cut-through path generation message received from the network interface 211 of the router device 101 is transferred to the IP processing unit 201 after referring to the label table 233 at the label processing unit 232 and determining that the IP processing is to be carried out at the own device (step S501).

The IP processing unit 201 to which the set up message is transferred then makes a judgement as to whether it is a message to be received by the own device or not, and sends data to the cut-through control unit 202 when it is a cut-through protocol message (step S502).

On the other hand, when the IP processing unit 201 judges that it is not a message to be received by the own device, the IP transfer processing is to be carried out so that the IP processing unit 201 determines a next hop router device by referring to the routing table 203, and transfers data to the next hop router device (step S503). At this point, if the router device 101 has a device configuration without the IP transfer function, the data may be discarded.

Next, at the cut-through control unit 202 that received the set up message from the IP processing unit 201, the final destination for the purpose of generating the cut-through path that is contained in the received message is acquired (step S504).

Also, the next hop router device is obtained by referring to the routing table 203 using the acquired final destination (step S505), and if the final destination is not reachable, the transfer of this message is interrupted (step S506).

Note that the operation after the message transfer interruption is different depending on the cut-through path generation protocol, and can be returning of a response to the previous hop router device 111 to 11N from the router device 101 or stopping of the protocol operation.

On the other hand, when the final destination exists at the step S505, the next hop router device information is obtained from an entry of the routing table 203 for the final destination.

In the network of FIG. 1, the router device 101 maintains the router device 102 and the router device 103 as the next hop information with respect to the router device 104 and the network 120 as already mentioned above.

Next, the next hop router device is to be selected at the cut-through control unit 202, and at this point, the cut-through control unit 202 checks the number of already set up cut-through paths with respect to the same final destination (step S507).

The number of already set up cut-through paths is used in the judgement to obtain the next hop information. For example, the next hop information is determined by an algorithm which selects the router device 102 when the number of already set up cut-through paths is a multiple of 3, or the router device 103 otherwise (step S508).

Note that when there are n pieces of the next hop information, and the link rate of the next hop i is given by $r(i)$, the next hop router devices can be selected at the frequencies corresponding to their link rates according to a value of "$y = c \bmod (r(1) + \ldots + r(n))$", for example, where c is the number of already set up cut-through paths (the number of values (the number of types) of y which should select the next hop i is set proportional to the link rate $r(i)$ of the next hop i).

For example, when there are three pieces of next hop information (assumed to be next hop #1, next hop #2, and next hop #3), and a ratio of link rate for the next hop #1: link rate for the next hop #2: link rate for the next hop #3=1:2:3 (where a total of elements (1, 2 and 3 in this case) constituting the ratio of the link rates=6), the next hop #3, #2, #1, #3, #2, or #3 is selected if a value of "y=c mod (the total of elements constituting the ratio of the link rates (=6)) is 0, 1, 2, 3, 4, or 5, respectively.

Also, the next hop router device selection algorithm is not limited to this, and any algorithm can be used as long as it makes a ratio of the numbers of paths for the next hop router devices identical (or nearly identical) to the ratio of the link rates.

At the cut-through control unit 202 which determined the next hop router device in this way, the set up message is transmitted to the router device 102 through the network interface 221 if the router device 102 is determined as the next hop router device or to the router device 103 through the network interface 222 if the router device 103 is determined as the next hop router device (step S509).

After that, at a timing where the set up completion message arrives from the router device 104 that is an end point of the cut-through path or an intermediate router device (step S510), a correspondence between the flow information and label information contained in the received message and the corresponding transmission flow information and label information is established, so that the cut-through path set up to an output network interface 221 or 222 from the input network interface 211 to 21N becomes possible, and therefore a transition to the cut-through transfer becomes possible (step S511).

The transition to the cut-through transfer is completed by setting the output label information in the label table 233 existing on the receiving network interface 211 to 21N, in the case of the router device in the configuration shown in FIG. 2.

As described, it can be seen that the case where the link rates are different can basically be handled by only changing the next hop router device selection algorithm.

Note that in the case accounting for the difference in the link rates and also using the merging switch (carrying out the merging), it is similar to the example of FIG. 4 described above, and it suffices to change the selection processing of the step S408 to the selection processing accounting for the link rates such as that of the step S508 of FIG. 5, for example.

Also, in this embodiment, it is possible to realize various usages and the load balancing for the case of using the merging as well as for the case of not using the merging, by changing the processing algorithm at a time of determining the next hop information in the processing of FIG. 3 to FIG. 5, that is, at the steps S308, S408, and S508. In the following, several exemplary applications will be described.

At the router device 101, various cut-through paths can be generated besides that for the router 104 or the network 120. For example, at the router device 101, the number of already set up cut-through paths with the router device 102 as the next hop router device and the number of already set up cut-through paths with the router device 103 as the next hop router device are accounted for the cut-through paths for the other destinations such that, when more cut-through paths are set up for either one (the router device 102 for instance), weights are applied so that the selection probability of the other router device (the router device 103 in this case) becomes higher. In this way, the cut-through paths with respect to the router device 102 and the router device 103 can be balanced overall.

Also, in the case where QoS information is contained at the edge router device at a time of the cut-through path generation, the algorithm can be changed such that the router device which can satisfy the specified QoS more easily will be selected according to the number of already set up cut-through paths that contain QoS.

Besides these, various other variations may also be considered.

Next, FIG. 6 shows an exemplary configuration of the routing table 203 used in order to obtain the next hop information from the header information such as that of IP in this embodiment.

A destination address field 601 has an information which serves as a key for obtaining the next hop information from the destination address information of the set up message as well as a ken at a time of the transfer.

A next hop information number field 602 is used for holding the number of next hop information that is held for the corresponding destination information, where two or more values are set in the case of multi-path.

The next hop information 611 to 61N is for holding an address of the next hop information for transferring datagram to the corresponding destination information, and the number of entries varies according to the value set to the next hop information number field 602. However, it is not absolutely necessary for this entry to have the actual address information of the next hop router device, and this entry may have an information indicating an information location where the next hop router device information is stored.

The number of cut-through paths field 603 indicates the number of already set up cut-through paths for the corresponding destination information, which can be used in the processing for determining a plurality of next hop router devices that are existing, in the processing shown in FIG. 3 to FIG. 5.

FIG. 7 shows an exemplary configuration of the label table 234 in this embodiment, which is to be used for transferring the received datagram (frame) without applying the IP processing, by obtaining an output interface and an output label and from a label value attached to the received datagram.

A received label field 701 has a label that coincides with a label contained in the header information of the received frame, which will become a key at a time of referring to this table. In the case of ATM, VPI/VCI is used.

An output interface field 702 specifies an output network interface, which is used for the purpose of switching at the switch unit 204.

A output label value field 703 is used for storing a label to be attached in order to transmit datagram to the next hop router device and a header information regarding its physical layer when the physical layer is different.

As described, according to this embodiment, it is possible to carry out the load balancing at the router device that actually has the multi-path information, without involving the edge router.

In addition, it is possible to realize the effective load balancing by preventing the complication of the control and the implementation.

Up to this point, the cut-through path set up, especially the selection of the next hop router device for the purpose of the load balancing, has been described. In the following, the cut-through path re-setting that is carried out according to the amount of traffic that actually flows.

Figure 8:
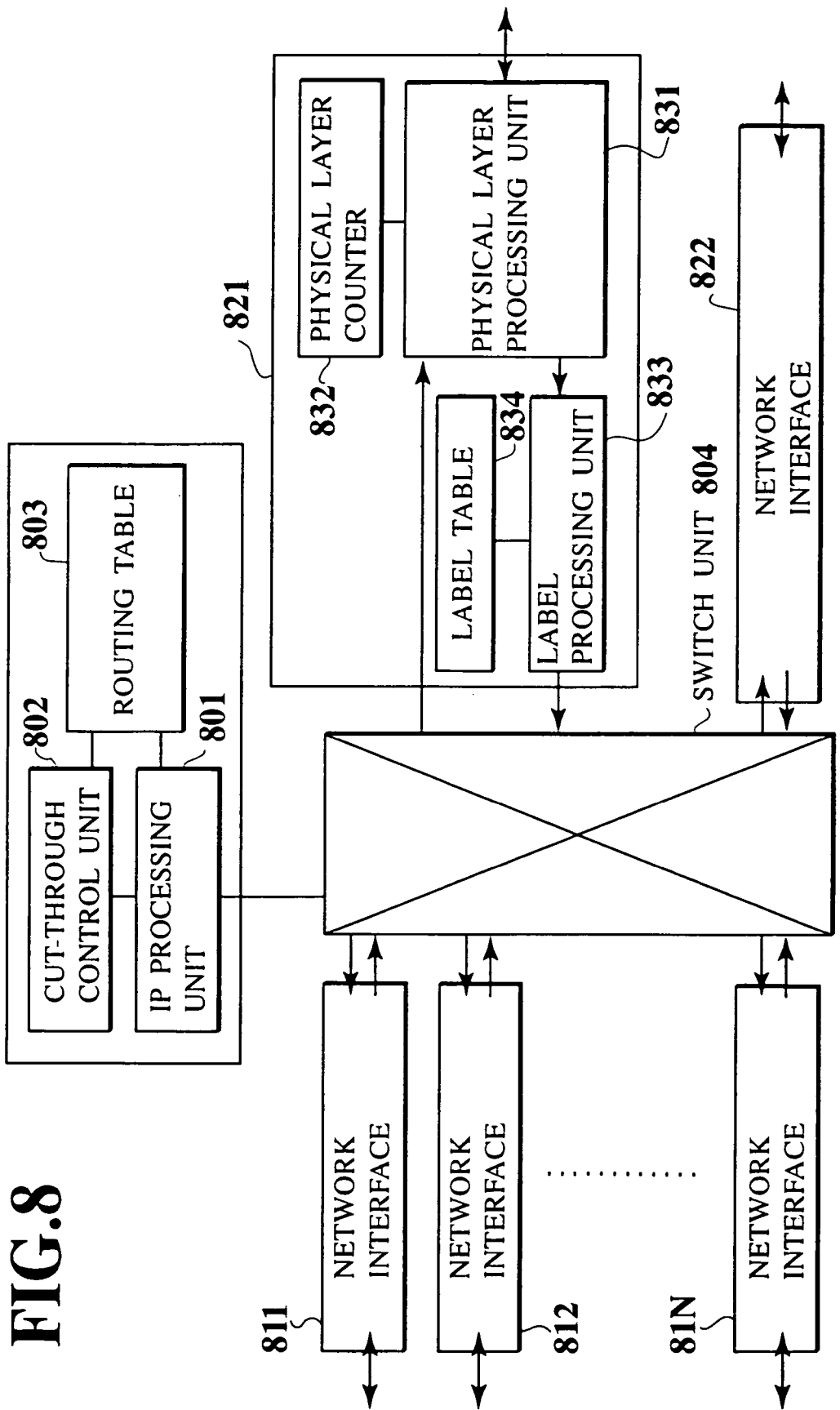
FIG. 8 is a block diagram showing another exemplary configuration of a router device according to the preferred embodiment of the present invention.

FIG. 8 shows an exemplary configuration of the router device 101 which is provided with a function for carrying out the cut-through path re-setting according to the amount of traffic that actually flows.

An IP processing unit 801 checks whether an IP datagram is destined to the own device or not according to a destination information of the datagram, and for the datagram destined to the own device, the reception processing is carried out and the datagram is transferred to an upper layer protocol (TCP, for example), whereas for the datagram not destined to the own device, a next hop transfer target is determined and a processing for transferring the datagram to a next hop router device is carried out.

Note that the router device 101 has a label switching function using labels so that it is not absolutely necessary for the router device 101 to have a transfer function with respect to the datagram not destined to the own device.

A cut-through control unit 802 carries out a protocol to be used in obtaining a common recognition regarding the datagram flow and the label information with the neighboring router devices (by exchanging information on the datagram flow and the labels).

A routing table 803 is a table used in obtaining a next hop router device from the destination address, where it is possible to have a plurality of next hop information but the next hop information is not necessarily always plural because there can be cases where no multi-path exists depending on the route.

Network interfaces 811 to 81N are respectively connected to the routers 111 to 11N, and can be provided in any form as long as FANP, TDP or LDP is usable on a physical layer. For example, they can be provided in forms of ATM, frame relay, Ethernet, etc.

A network interface 821 is connected to the router device 102 and operates similarly as the network interfaces 811 to 81N (here it is assumed to have the same configuration as the network interfaces 811 to 81N).

A network interface 822 is connected to the router device 103 and operates similarly as the network interfaces 811 to 81N (here it is assumed to have the same configuration as the network interfaces 811 to 81N).

A switch unit 804 is a switch device capable of directly switching datagram from one network interface to another network interface when the cut-through transfer is possible.

Now, a configuration of each network interface will be described using the network interface 821 as an example.

A physical layer processing unit 831 carries out different types of processing according to the physical layer accommodated by the network interface, such as the cell synchronization processing, etc., in the case of ATM and the MAC processing, etc., in the case of Ethernet.

A physical layer counter 832 holds the number of physical layer frames to be transmitted from the network interface 821.

A label processing unit 833 determines a label for a next hop router device by referring to the label table 834 after extracting a label from the header information of the received datagram (frame), and carries out a processing for transferring the datagram to the next hop router directly through the switch unit 804 without carrying out the IP processing.

Note that, in the case of ATM, a switch table in terms of VPI/VCI used by the ATM switch or the like can be used directly as the label processing unit 833 and the label table 834, and in the case where the network interfaces possessed by the router device 101 are all given in forms of ATM, all the functions of the network interfaces 811 to 81N, 821 and 822, the label processing unit 833, the label table 834 and the switch unit 804 can be realized by an ATM switch.

The procedure for re-setting the cut-through path according to the amount of traffic that actually flows is realized in outline by regularly referring to the count value of the traffic amount for each target network interface, judging whether or not to re-set the cut-through path according to a prescribed criterion, and carrying out the re-setting (set up/release in the case of not carrying out the merging, the content change of the label table in the case of carrying out the merging) of one or a plurality of cut-through paths that are selected by a prescribed method, either separately or collectively, when it is judged that the re-setting should be made.

Figure 9:
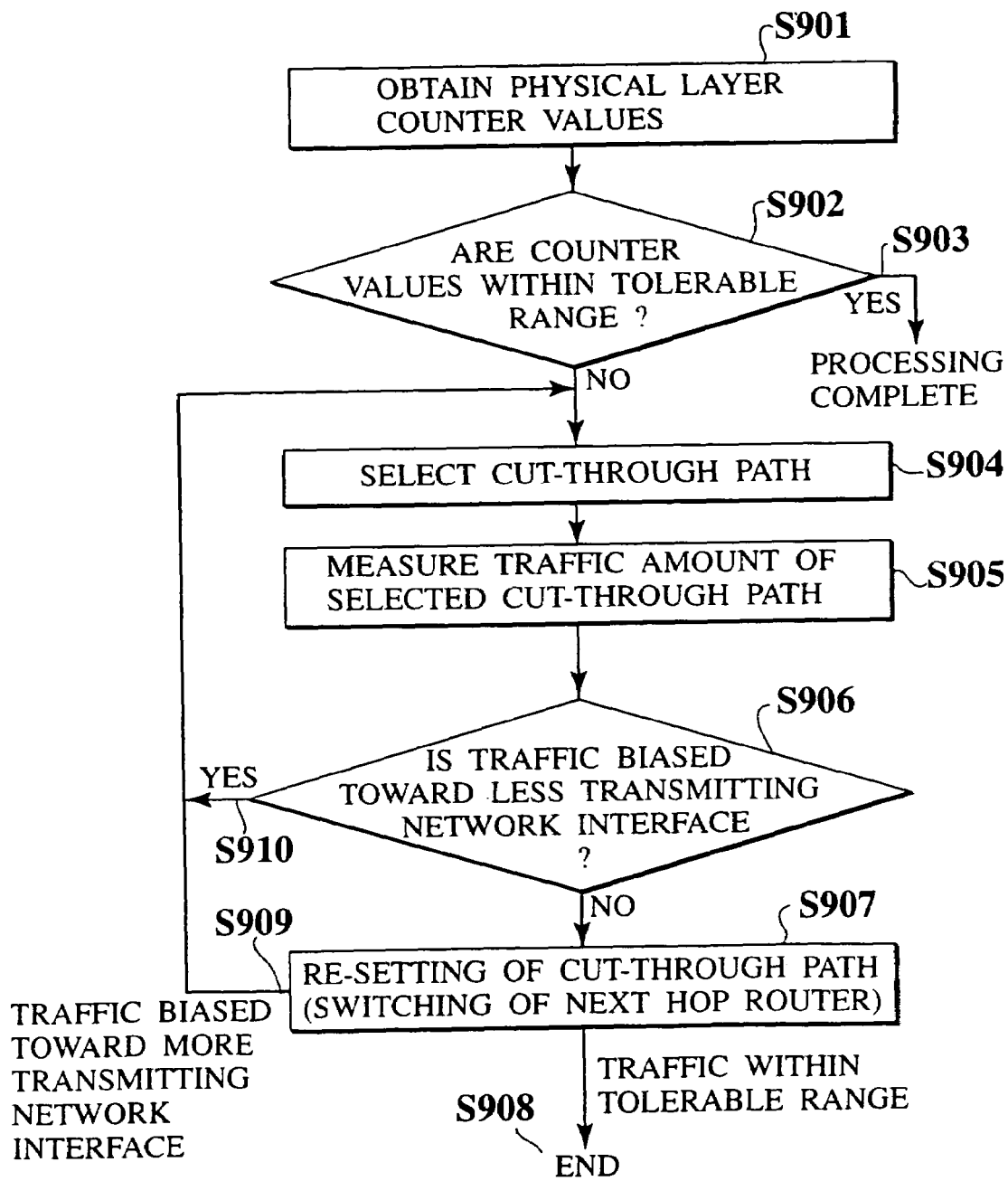
FIG. 9 is a flow chart showing one exemplary cut-through path re-setting procedure that can be carried out by the router device of FIG. 8.

FIG. 9 shows an exemplary processing procedure for carrying out the cut-through path re-setting by measuring the actual transmission traffic after the router device 111 to 11N generated the cut-through path with the network 120 or the router device 104 as the final destination by the method of FIG. 3, for example. Here, the case of not carrying out the merging at the router device 101 will be described.

This procedure is to be carried out repeatedly at appropriate timings.

At the router device 101, when the multi-path exists in the routing table 803 (the network 120 and the router device 104 in this example), the traffics are measured for the network interfaces that are specified as their output interfaces (step S901). In this case, the network interface 821 and the network interface 822 are measured.

The traffic measurement can be made for the traffic on the set up cut-through path, but in order to check if the traffics are balanced, it is more efficient to use the physical layer counter 832 that exists on the network interface 821. The same is also true for the network interface 822.

When the output counter values are obtained from the respective physical layer counters 832 of the network interface 821 and the network interface 822, the both output counter values are compared or evaluated, and whether a relationship between these values (a ratio for example) is within a tolerable range or not is checked (step S902).

Here, the tolerable range is determined by the link rates and the utilization rate of the network interface 821 and the network interface 822, and a ratio of the count value of the traffic amount of the network interface 821 and the count value of the traffic amount of the network interface 822 should preferably coincide with or close to a ratio of their link rates, for example. Also, it may be judged as within the tolerable range even if the traffics are not balanced when the traffic amounts are small on both interfaces.

After the above checking, if it is within the tolerable range, the processing can be finished by regarding that the traffics are balanced (step S903).

On the other hand, in the case where the tolerable range is exceeded at the step S902, one re-setting target cut-through path is selected from the cut-through paths set up in the multi-path at the network interface with more transmission amount (which is assumed to be the network interface 821 side for example) (step S904), and the count value of the traffic amount flowing through the selected cut-through path is measured (step S905).

Next, a value (M+x) obtained by adding the traffic amount x of the selected cut-through path to the traffic amount M of the network interface (822) with less transmission amount and a value (N−x) obtained by subtracting the traffic amount x of the selected cut-through path from the traffic amount N of the network interface (821) with more transmission amount are compared or evaluated (step S906), to see if these calculated values are within the tolerable range, or excessively biased toward the network interface (821) with more transmission amount, or else excessively biased toward the network interface (822) with less transmission amount.

When these calculated values are within the tolerable range or biased toward the network interface (821) with more transmission amount, the cut-through path re-setting is carried out such that the next hop router of the cut-through path for which the traffic was measured is switched from the router device (102) corresponding to the network interface (821) with more transmission amount to the router device (103) corresponding to the network interface (822) with less transmission amount (step S907). Then, in the case where these calculated values are within the tolerable range, the processing is finished (step S908), whereas in the case where these calculated values are biased toward the network interface (821) with more transmission amount, the processing from the step S904 on is repeated (step S909).

The method of re-setting is different depending on the cut-through protocol, and includes the method which sets up after releasing the cut-through path and the method which carries out the release processing after the set up.

On the other hand, in the case where these calculated values are biased toward the network interface (822) with less transmission amount, the output target of the measured cut-through path is not changed and the processing from the step S904 on is repeated in order to switch the other cut-through path (step S910).

In the case of such a method, there can be cases where the tolerable range is not reached even after the balancing, and in such a case, it is possible to take one of the current state and the state expected after the re-setting which is closer to the tolerable range.

FIG. 10 shows an exemplary processing procedure for carrying out the cut-through path re-setting by measuring the actual transmission traffic after the router device 111 to 11N generated the cut-through path with the network 120 or the router device 104 as the final destination by the method of FIG. 4, for example. Here, the case of carrying out the merging at the router device 101 will be described.

This procedure is to be carried out repeatedly at appropriate timings.

At the router device 101, when the multi-path exists in the routing table 803 (the network 120 and the router device 104 in this example), the traffics are measured for the network interfaces that are specified as their output interfaces (step S1001). In this case, the network interface 821 and the network interface 822 are measured.

The traffic measurement can be made for the traffic on the set up cut-through path, but in order to check if the traffics are balanced, it is more efficient to use the physical layer counter 832 that exists on the network interface 821. The same is also true for the network interface 822.

When the output counter values are obtained from the respective physical layer counters 832 of the network interface 821 and the network interface 822, the both output counter values are compared or evaluated, and whether a relationship between these values (a ratio for example) is within a tolerable range or not is checked (step S1002).

Here, the tolerable range is determined by the link rates and the utilization rate of the network interface 821 and the network interface 822, and a ratio of the count value of the traffic amount of the network interface 821 and the count value of the traffic amount of the network interface 822 should preferably coincide with or close to a ratio of their link rates, for example. Also, it may be judged as within the tolerable range even if the traffics are not balanced when the traffic amounts are small on both interfaces.

After the above checking, if it is within the tolerable range, the processing can be finished by regarding that the traffics are balanced (step S1003).

On the other hand, in the case where the tolerable range is exceeded at the step S1002, one re-setting target cut-through path is selected from the cut-through paths set up in the multi-path at the network interface with more transmission amount (which is assumed to be the network interface 821 side for example) (step S1004), and the count value of the traffic amount flowing through the selected cut-through path is measured (step S1005).

Here, it is important to note that the transmission traffic of each cut-through path is already a value after the merging, so that there is a need to measure the received traffic before the merging.

Next, a value (M+x) obtained by adding the traffic amount x of the selected cut-through path to the traffic amount M of the network interface (822) with less transmission amount and a value (N−x) obtained by subtracting the traffic amount x of the selected cut-through path from the traffic amount N of the network interface (821) with more transmission amount are compared or evaluated (step S1006), to see if these calculated values are within the tolerable range, or excessively biased toward the network interface (821) with more transmission amount, or else excessively biased toward the network interface (822) with less transmission amount.

When these calculated values are within the tolerable range or biased toward the network interface (821) with more transmission amount, the entry of the label table 834 for the cut-through path for which the traffic was measured is rewritten into a label for outputting to the network interface (822) with less transmission amount (step S1007). After this label table setting, in the case where these calculated values are within the tolerable range as a result of the processing of the step S1006, the processing is finished (step S1008), whereas in the case where these calculated values are biased toward the network interface (821) with more transmission amount, the processing from the step S1004 on is repeated (step S1009).

Note that whether or not the protocol processing is necessary for the cut-through path for which the output target is changed here depends on the protocol used.

On the other hand, in the case where these calculated values are biased toward the network interface (822) with less transmission amount, the output target of the measured cut-through path is not changed and the processing from the step S1004 on is repeated in order to switch the other cut-through path (step S1010).

In the case of such a method, there can be cases where the tolerable range is not reached even after the balancing, and in such a case, it is possible to take one of the current state and the state expected after the re-setting which is closer to the tolerable range.

Note that there are various choices for the criterion used in the comparison or evaluation at the step S906 in the procedure of FIG. 9 or the step S1006 in the procedure of FIG. 10.

For example, when the size relationship between the traffic amounts is reversed if the selected cut-through path is re-set, that is, when N>M and (N−x)<(M+x), it is possible not to adopt (re-set) the selected cut-through path, in which case it is judged as excessively biased to the network interface (822 in this example) with less transmission amount when (N−x)<(M+x) so that the processing returns from the step S906/S1006 to the step S904/S1004, the processing is finished from the step S907/S1007 when it is judged as within the tolerable range, and it is judged as excessively biased to the network interface (821 in this example) with more transmission amount otherwise so that the processing returns from the step S907/S1007 to the step S904/S1004.

It is also possible to judge the calculated values as within the tolerable range when upper limit≧(N−x)/(M+x)≧lower limit, or as excessively biased toward the network interface (821 in this example) with more transmission amount when (N−x)/(M+x)>upper limit, or else as excessively biased toward the network interface (822 in this example) with less transmission amount when lower limit>(N−x)/(M+x), for example.

Also, there are various choices for the cut-through path selection method at the step S904 in the procedure of FIG. 9 or the step S1004 in the procedure of FIG. 10.

For example, the entries of the label table 834 may be selected one by one in an order of their arrangement. Also, the entries of the label table 834 may be sequentially selected in a descending order of their traffic amount count values, for example Also, the exemplary procedures of FIG. 9 and FIG. 10 are directed to the case of repeating a series of processings including the selection of one re-setting target cut-through path, the judgement as to whether or not to carry out the re-setting of the selected cut-through path, the re-setting in the case where it is judged that the re-setting is to be carried out, and the judgement as to whether or not to continue the repeated processing, but it is also possible to carry out the selection of the re-setting target cut-through paths at the beginning and then carry out the re-setting collectively.

It is also possible to obtain the optimal solution or the next-to-optimal solution for one or a plurality of cut-through paths to be re-set by accounting for the traffic amount of each network interface and the traffic amount of each cut-through path set up in the multi-path. In this case, if a plurality of solutions exist, one with the smallest number of cut-through paths to be re-set may be selected. Also, if a plurality of solutions exist, a solution may be selected by comprehensively accounting for the level of the resulting balance, the number of cut-through paths to be re-set, etc.

Next, FIG. 11 shows an exemplary configuration of the label table 834 in this embodiment, which is to be used for transferring the received datagram (frame) without applying the IP processing, by obtaining an output interface and an output label and from a label value attached to the received datagram.

A received label field 1101 has a label that coincides with a label contained in the header information of the received frame, which will become a key at a time of referring to this table. In the case of ATM, VPI/VCI is used.

An output interface field 1102 specifies an output network interface, which is used for the purpose of switching at the switch unit 804.

A output label value field 1103 is used for storing a label to be attached in order to transmit datagram to the next hop router device and a header information regarding its physical layer when the physical layer is different.

A number of received frames field 1104 indicates the number of frames transferred by this label table information, which is referred at a time of traffic measurement in units of cut-through path in the procedures of FIG. 9 and FIG. 10.

As described, according to this embodiment, it is possible to realize the more effective load balancing as the cut-through path re-setting is carried out according to the amount of traffic that actually flows.

It is to be noted that the router device and the set up procedure as described with references to FIGS. 1 to 7 and the router device and the re-setting procedure as described with references to FIGS. 1 and 8 to 11 may be practiced either in combination or independently.

It is also to be noted that, in the above description, the router device is assumed to be a device having a routing table of the network layer such as IP.

Also a procedure for selecting the router device so as to contribute to the load balancing may include not just a procedure for selecting any router device that contributes most to the load balancing at that moment, but also a procedure for realizing the load balancing over a prescribed span.

As a simple example, when there are three routers (route #1, router #2, router #3) that can possibly be the next hop router, a procedure for selecting the routers in an order of #1, #2, #3, #1, #2, #3, and so on will provide the former procedure, while a procedure for selecting the routers in an order of #1, #1, #2, #2, #3, #3, #1, #1, #2, #2, #3, #3, and so on will provide the latter procedure.

Also, the load balancing may be carried out for each range of the cut-through paths that are set up in the multi-path sharing the same destination, or over the entire cut-through paths. Besides these, various other methods are also possible in this regard. It is also possible to realize the effective load balancing by accounting for the various factors.

Also a procedure for selecting the router device so as to distribute the numbers of cut-through paths uniformly may include not just a procedure for selecting any router device that contributes most to the uniformization at that moment, but also a procedure for realizing the uniformization over a prescribed span.

As a simple example, when there are two routers (route #1, router #2) that can possibly be the next hop router, the router #1 is selected when a residue obtained by dividing a certain integer by the number of these routers is 0, and the router #2 is selected when the residue is 1, such that the routers are selected in an order of #1, #2, #1, #2, and so on.

Also a procedure for selecting the router device so as to distribute the numbers of cut-through paths evenly according to the link rate of each router device may include not just a procedure for selecting any router device that contributes most to the even distribution at that moment, but also a procedure for realizing the even distribution over a prescribed span.

As a simple example, when there are three routers (route #1, router #2, router #3) that can possibly be the next hop router and a ratio of link rate of router #1: link rate of router #2: link rate of router #3=1:2:3, the router #3 is selected when a residue obtained by dividing a certain integer by a total of elements constituting a ratio that indicates or approximates a ratio of the link rates is 0, 3 or 5, the router #2 is selected when the residue is 1 or 4, and the router #1 is selected when the residue is 2 such that the routers are selected in an order of #3, #2, #1, #3, #2, #3, #3, #2, #1, #3, #2, #3, and so on. Alternatively, it is also possible to use a procedure in which the router #3 is selected when the residue is 0, 1 or 2, the router #2 is selected when the residue is 3 or 4, and the router #1 is selected when the residue is 5 such that the routers are selected in an order of #3, #3, #3, #2, #2, #1, #3, #3, #3, #2, #2, #1, and so on.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each router device of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy-disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A router device at which multi-path exists, comprising:
   a processing unit configured to select one router among a plurality of routers that can possibly be a next hop router so as to contribute to a load balancing, according to a whole or a prescribed part of information regarding a state of cut-through path set up in which the router device is involved, at a time of setting up a cut-through path in the multi-path;
   a control unit configured to carry out a prescribed control for setting up the cut-through path with said one router as the next hop router; and
   a transfer unit configured to transfer datagrams using the cut-through path,
   wherein the processing unit selects said one router according to a number of already set up cut-through paths that are used to route packets to a same destination node such that numbers of cut-through paths at said plurality of routers are uniformly distributed among said plurality of routers,
   wherein the processing unit:
   assigns possible residue values starting from 0 that are obtainable by dividing a given integer by a total number of said plurality of routers, respectively to said plurality of routers, one residue value per each router; and
   selects one of said plurality of routers which is assigned with a residue value obtained by dividing the number of already set up cut-through paths by the total number of said plurality of routers as said one router,
   wherein the control unit:
   sends a message for setting up the cut-through path to said one router when no other already set up cut-through path to said one router exists, and making an information setting necessary for utilizing the cut-through path when the cut-through path is set up; and
   makes another information setting necessary for merging the cut-through path with an already set up cut-through path to said one router when the already set up cut-through path exists.

2. A router device at which multi-path exists, comprising:
   a processing unit configured to select one router among a plurality of routers that can possibly be a next hop router so as to contribute to a load balancing, according to a whole or a prescribed part of information regarding a state of cut-through path set up in which the router device is involved, at a time of setting up a cut-through path in the multi-path;
   a control unit configured to carry out a prescribed control for setting up the cut-through path with said one router as the next hop router; and
   a transfer unit configured to transfer datagrams using the cut-through path,
   wherein the processing unit selects said one router according to a number of already set up cut-through paths that are used to route packets to a same destination node such that numbers of cut-through paths at said plurality of routers are uniformly distributed among said plurality of routers,
   wherein the processing unit:
   assigns possible residue values starting from 0 that are obtainable by dividing a given integer by a total number of said plurality of routers, respectively to said plurality of routers, one residue value per each router; and
   selects one of said plurality of routers which is assigned with a residue value obtained by dividing the number of already set up cut-through paths by the total number of said plurality of routers as said one router,
   wherein the setting up of the cut-through path starts at a timing of receiving a message for setting up the cut-through path from a node device on an upstream side.

3. The router device of claim 2, wherein the processing unit selects said one router according to a number of already set up cut-through paths that are used to route packets to a same destination node that is also included in the message for setting up the cut-through path that is received by said router device.

4. A router device at which multi-path exists, comprising:
   a processing unit configured to select one router among a plurality of routers that can possibly be a next hop router so as to contribute to a load balancing, according to a whole or a prescribed part of information regarding a state of cut-through path set up in which the router device is involved, at a time of setting up a cut-through path in the multi-path;
   a control unit configured to carry out a prescribed control for setting up the cut-through path with said one router as the next hop router; and
   a transfer unit configured to transfer datagrams using the cut-through path,
   wherein the processing unit selects said one router according to a number of already set up cut-through paths that are used to route packets to a same destination node such that the numbers of cut-through paths at said plurality of routers are evenly distributed among said plurality of routers according to link rates with respect to said plurality of routers,
   wherein the processing unit:
   assigns possible residue values starting from 0 that are obtainable by dividing a given integer by a total of elements constituting an integer ratio indicating or approximating a ratio of the link rates with respect to said plurality of routers, respectively to said plurality of routers, as many residues values as a number proportional to a link rate with respect to each router per each router; and
   selects one of said plurality of routers which is assigned with a residue value obtained by dividing the number of already set up cut-through paths by the total of the elements constituting the integer ratio as said one router, wherein the control unit:

sends a message for setting up the cut-through path to said one router when no other already set up cut-through path to said one router exists, and making an information setting necessary for utilizing the cut-through path when the cut-through path is set up; and makes another information setting necessary for merging the cut-through path with an already set up cut-through path to said one router when the already set up cut-through path exists.

5. A router device at which multi-path exists, comprising:

a processing unit configured to select one router among a plurality of routers that can possibly be a next hop router so as to contribute to a load balancing, according to a whole or a prescribed part of information regarding a state of cut-through path set up in which the router device is involved, at a time of setting up a cut-through path in the multi-path;

a control unit configured to carry out a prescribed control for setting up the cut-through path with said one router as the next hop router; and a transfer unit configured to transfer data grams using the cut-through path, wherein the processing unit selects said one router according to a number of already set up cut-through paths that are used to route packets to a same destination node such that the numbers of cut-through paths at said plurality of routers are evenly distributed among said plurality of routers according to link rates with respect to said plurality of routers, wherein the processing unit:

assigns possible residue values starting from 0 that are obtainable by dividing a given integer by a total of elements constituting an integer ratio indicating or approximating a ratio of the link rates with respect to said plurality of routers, respectively to said plurality of routers, as many residues values as a number proportional to a link rate with respect to each router per each router; and selects one of said plurality of routers which is assigned with a residue value obtained by dividing the number of already set up cut-through paths by the total of the elements constituting the integer ratio as said one router, wherein the setting up of the cut-through path starts at a timing of receiving a message for setting up the cut-through path from a node device on an upstream side.

6. The router device of claim 5, wherein the processing unit selects said one router according to a number of already set up cut-through paths that are used to route packets to a same destination node that is also included in the message for setting up the cut-through path that is received by said router device.

* * * * *